United States Patent
Krishnan et al.

(10) Patent No.: US 7,408,914 B2
(45) Date of Patent: Aug. 5, 2008

(54) TIME-HOPPING SYSTEMS AND TECHNIQUES FOR WIRELESS COMMUNICATIONS

(75) Inventors: Ranganathan Krishnan, San Diego, CA (US); Joseph Patrick Burke, Carlsbad, CA (US); Amol Rajkotia, San Diego, CA (US); Sanjiv Nanda, Ramona, CA (US)

(73) Assignee: QUALCOMM Incorporated, San Diego, CA (US)

( * ) Notice: Subject to any disclaimer, the term of this patent is extended or adjusted under 35 U.S.C. 154(b) by 673 days.

(21) Appl. No.: 10/754,789

(22) Filed: Jan. 8, 2004

(65) Prior Publication Data
US 2005/0152329 A1 Jul. 14, 2005

(51) Int. Cl.
*H04J 3/00* (2006.01)
*H04B 1/00* (2006.01)

(52) U.S. Cl. .................. 370/345; 375/132; 375/133

(58) Field of Classification Search ............... 370/350, 370/329–333, 345–348, 336, 337; 375/132, 375/138, 133; 455/41.2, 418, 435.1, 436, 455/452.1, 450, 507, 511, 68
See application file for complete search history.

(56) References Cited

U.S. PATENT DOCUMENTS

| | | | |
|---|---|---|---|
| 5,291,475 A | 3/1994 | Bruckert | |
| 5,896,375 A | 4/1999 | Dent et al. | |
| 6,393,007 B1 * | 5/2002 | Haartsen | 370/337 |
| 6,590,928 B1 | 7/2003 | Haartsen | |
| 6,920,171 B2 * | 7/2005 | Souissi et al. | 375/133 |
| 6,944,148 B1 * | 9/2005 | Gehring et al. | 370/347 |
| 2002/0075940 A1 | 6/2002 | Haartsen | |
| 2003/0063597 A1 | 4/2003 | Suzuki | |
| 2003/0081603 A1 * | 5/2003 | Rune | 370/390 |
| 2003/0169697 A1 * | 9/2003 | Suzuki et al. | 370/310 |

FOREIGN PATENT DOCUMENTS

| | | |
|---|---|---|
| WO | 02063806 | 8/2002 |
| WO | 03103230 | 12/2003 |

OTHER PUBLICATIONS

Chiasserini and Rao, "Coexistence Mechanisms for Interference Mitigation Between IEEE 802.11 WLANs and Bluetooth," IEEE Proceedings, Jun. 23-27 (2002).

* cited by examiner

*Primary Examiner*—George Eng
*Assistant Examiner*—Nam Huynh
(74) *Attorney, Agent, or Firm*—Albert J. Harnois, Jr.; Alan C. Gordon; Thomas R. Rouse

(57) ABSTRACT

Systems and techniques are disclosed relating to wireless communications. The systems and techniques involve wireless communications wherein a process, module or communications terminal schedules communications over a frame having a plurality of time slots. The process, module or communications terminal may be used to assign information to be transmitted between two terminals to a block of the time slots within a frame, and reordering the time slot assignments within the frame using a permutation function, the permutation function being a function of frame count.

17 Claims, 10 Drawing Sheets

TIME-HOPPING SYSTEMS AND TECHNIQUES FOR WIRELESS COMMUNICATIONS

BACKGROUND

1. Field

The present disclosure relates generally to wireless communications, and more specifically, to various time-hopping systems and techniques for wireless communications.

2. Background

In conventional wireless communications, an access network is generally employed to support communications for a number of mobile devices. These access networks are typically implemented with multiple fixed site base stations dispersed throughout a geographic region. The geographic region is generally subdivided into smaller regions known as cells. Each base station may be configured to serve all mobile devices in its respective cell. As a result, the access network may not be easily reconfigured to account for varying traffic demands across different cellular regions.

In contrast to the conventional access network, ad-hoc networks are dynamic. An ad-hoc network may be formed when a number of wireless communication devices, often referred to as terminals, decide to join together to form a network. Since terminals in ad-hoc networks operate as both hosts and routers, the network may be easily reconfigured to meet existing traffic demands in a more efficient fashion. Moreover, ad-hoc networks do not require the infrastructure required by conventional access networks, making ad-hoc networks an attractive choice for the future.

A completely ad-hoc network consisting of peer-to-peer connections generally result in very inefficient communications. To improve efficiency, the terminals may organize themselves into a collection of piconets. A "piconet" is a group of terminals in close proximity to one another. The piconet may have a master terminal that schedules access to the communications medium for the terminals in its piconet.

Numerous multiple access techniques exist to support communications in an ad-hoc network. A Frequency Division Multiple Access (FDMA) scheme, by way of example, is a very common technique. FDMA typically involves allocating distinct portions of the total bandwidth to individual communications between two terminals in the piconet. While this scheme may be effective for uninterrupted communications, better utilization of the total bandwidth may be achieved when such constant, uninterrupted communication is not required.

Other multiple access schemes include Time Division Multiple Access (TDMA). These TDMA schemes may be particularly effective in allocating limited bandwidth among a number of terminals which do not require uninterrupted communications. TDMA schemes typically dedicate the entire bandwidth to each communication channel between two terminals at designated time intervals.

Code Division Multiple Access (CDMA) techniques may be used in conjunction with TDMA to support multiple communications during each time interval. This may be achieved by transmitting each communication or signal in a designated time interval with a different code that modulates a carrier, and thereby, spreads the signal. The transmitted signals may be separated in the receiver terminal by a demodulator that uses a corresponding code to de-spread the desired signal. The undesired signals, whose codes do not match, are not de-spread and contribute only to noise.

In TDMA systems that use spread-spectrum communications, each master terminal may schedule transmissions within its own piconet in a way that does not cause excessive mutual interference. However, it may be more difficult to manage interference from other piconets, or "inter-piconet interference". Inter-piconet interference management generally involves the coordination of transmission schedules across multiple piconets. While this approach may be workable between a handful of master terminals, it may be problematic in larger networks due to scheduling delays and excessive overhead. Accordingly, a more robust and efficient scheduling algorithm is needed which addresses the problems of inter-piconet interference.

SUMMARY

In one aspect of the present invention, a method of scheduling communications over a frame having a plurality of time slots includes assigning information to be transmitted between two terminals to a block of the time slots within a frame, and reordering the time slot assignments within the frame using a permutation function, the permutation function being a function of frame count.

In another aspect of the present invention, a communications terminal includes a transceiver configured to receive a block of time slot assignments within a frame to communicate with a remote terminal, and a controller configured to reorder the time slot assignments within the frame using a permutation function, the permutation function being a function of frame count.

In yet another aspect of the present invention, a communications terminal configured to operate in a first piconet includes a transceiver configured to receive a block of time slot assignments within a frame for a transmission between a bridge terminal and a terminal in a second piconet, the bridge terminal belonging to the first and second piconets, and a scheduler configured to reorder the time slot assignments within the frame using a permutation function for the second piconet, demap the reordered time slots within the frame using a permutation function for the first piconet, and use the demapped time slots as a constraint in assigning a block of time slots within the frame for a transmission between two terminals in the first piconet, the permutation for the first piconet being different from the permutation function for the second piconet.

In a further aspect of the present invention, a communications terminal includes means for receiving a block of time slot assignments within a frame to communicate with a remote terminal, and means for reordering the time slot assignments within the frame using a permutation function, the permutation function being a function of frame count.

It is understood that other embodiments of the present invention will become readily apparent to those skilled in the art from the following detailed description, wherein various embodiments of the invention are shown and described by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

Aspects of the present invention are illustrated by way of example, and not by way of limitation, in the accompanying drawings, wherein.

DETAILED DESCRIPTION

The detailed description set forth below in connection with the appended drawings is intended as a description of various embodiments of the present invention and is not intended to represent the only embodiments in which the present invention may be practiced. Each embodiment described in this disclosure is provided merely as an example or illustration of the present invention, and should not necessarily be construed as preferred or advantageous over other embodiments. The detailed description includes specific details for the purpose of providing a thorough understanding of the present invention. However, it will be apparent to those skilled in the art that the present invention may be practiced without these specific details. In some instances, well-known structures and devices are shown in block diagram form in order to avoid obscuring the concepts of the present invention. Acronyms and other descriptive terminology may be used merely for convenience and clarity and are not intended to limit the scope of the invention.

In the following detailed description, various aspects of the present invention may be described in the context of an Ultra Wide Band (UWB) wireless communications system. While these inventive aspects may be well suited for use with this application, those skilled in the art will readily appreciate that these inventive aspects are likewise applicable for use in various other communication environments. Accordingly, any reference to a UWB communications system is intended only to illustrate the inventive aspects, with the understanding that such inventive aspects have a wide range of applications.

Figure 1:
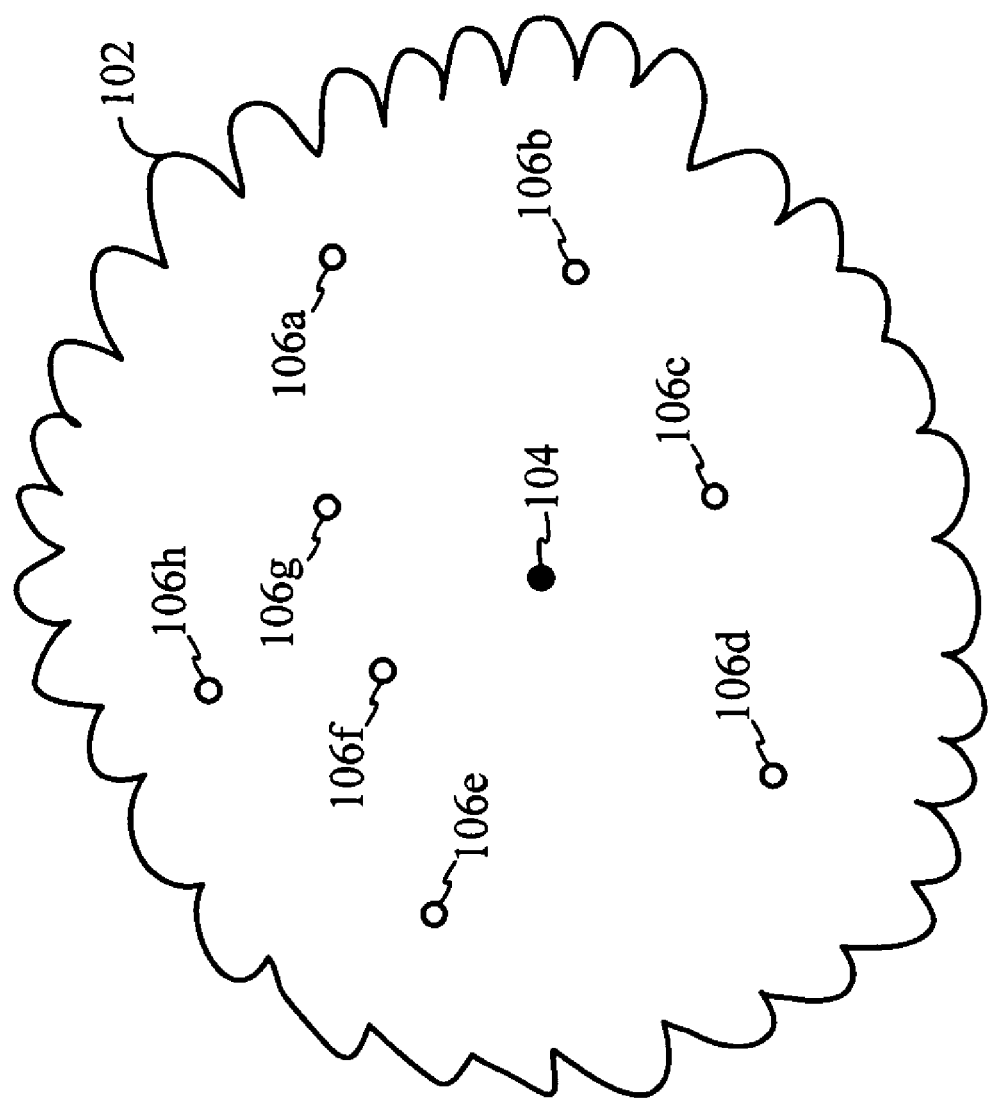
FIG. 1 is a conceptual diagram illustrating an example of a piconet.

FIG. 1 illustrates an example of a network topology for a piconet in a wireless communications system. A piconet 102 is shown with a master terminal 104 supporting communications between several member terminals 106a-106h. The master terminal 104 may be able to communicate with each of the member terminals 106 in the piconet. The member terminals 106 may also be able to directly communicate with one another under control of the master terminal 104. As to be explained in greater detail below, each member terminal 106 in the piconet 102 may also be able to directly communicate with terminals outside the piconet.

The master terminal 104 may communicate with the member terminals 106 using a multiple access scheme, such as TDMA, FDMA, CDMA, or another multiple access scheme.

To illustrate the various aspects of the present invention, the wireless communications system shown in FIG. 1 will be described in the context of a hybrid multiple access scheme employing both TDMA and CDMA technologies. Those skilled in the art will readily understand that the present invention is in no way limited to such multiple access schemes.

A piconet may be formed in a variety of ways. By way of example, when a terminal initially powers up, it may search for pilot signals from various piconet master terminals. The pilot signal broadcast from each piconet master terminal may be an unmodulated spread-spectrum signal, or another type of reference signal. In spread-spectrum communications, a psuedo-random noise (PN) code unique to each piconet master terminal may be used to spread the pilot signal. Using a correlation process, the terminal may search through all possible PN codes to locate a pilot signal from a master terminal, such as the pilot signal broadcast from the master terminal 104 in FIG. 1. The pilot signal may be used by the member terminal 106 to synchronize to the master terminal 104. The acquisition of a spread spectrum pilot signal is well known in the art.

The master terminal 104 may be used to manage high data rate communications. This may be achieved by allowing only those terminals that can support a minimum or threshold data rate with the master terminal 104 to join the piconet 102. In UWB communication systems, for example, a data rate of 1.2288 Mbps may be supported at a distance of 30-100 meters depending on the propagation conditions. In these systems, the master terminal 104 may be configured to organize the piconet 102 with member terminals 106 that can support a data rate of at least 1.2288 Mbps. If higher data rates are desired, the range may be further restricted. By way of example, data rates of 100 Mbps may be achieved in UWB systems at a range of 10 meters.

The member terminal 106 may be configured to determine whether it can satisfy the minimum data rate requirements of the piconet by measuring the link quality using the pilot signal broadcast from the master terminal 104. As discussed in greater detail above, a terminal may identify a pilot signal through a correlation process. The link quality may then be measured by computing the carrier-to-interference (C/I) ratio from the pilot signal by means well known in the art. Based on the C/I ratio computation, the member terminal 106 may then determine whether the minimum or threshold data rate may be supported by means also well known in the art. If the member terminal 106 determines that the minimum or threshold data rate may be supported, it may attempt to join the piconet 102 by registering with the master terminal 104.

Figure 2:
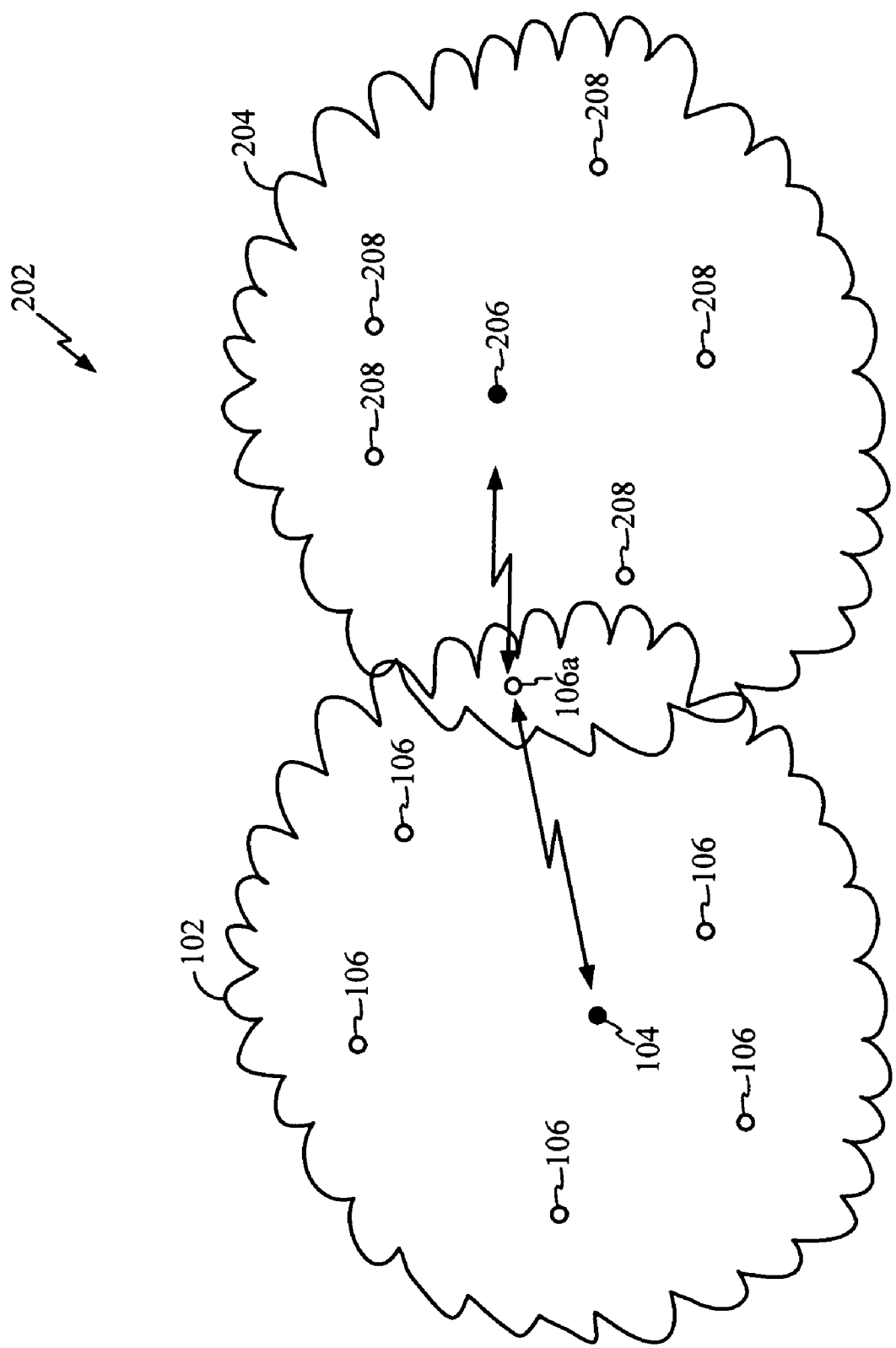
FIG. 2 is a conceptual diagram illustrating an example of two piconets forming a piconet cluster.

A member terminal that is able to communicate at the minimum or threshold data rate with two (or more) master terminals becomes an "intra-cluster bridge terminal" between the two piconets, and the two piconets become members of the same cluster. FIG. 2 is an example of a network topology illustrating a cluster 202 formed by two piconets 102 and 204. The first piconet 102 of the cluster 202 is the same piconet described in connection with FIG. 1 with its master terminal 104 supporting several member terminals 106. The second piconet 204 of the cluster 202 includes a master terminal 206 also supporting several member terminals 208. The member terminal 106a is a member of both the first and second piconets 102 and 204, and is therefore an intra-cluster bridge terminal. If there is more than one intra-cluster bridge between two piconets, one of them is chosen to be the primary intra-cluster bridge and the others are secondary bridges. Communications between the two piconets 102 and 204 may be routed through the primary intra-cluster bridge terminal.

Figure 3:
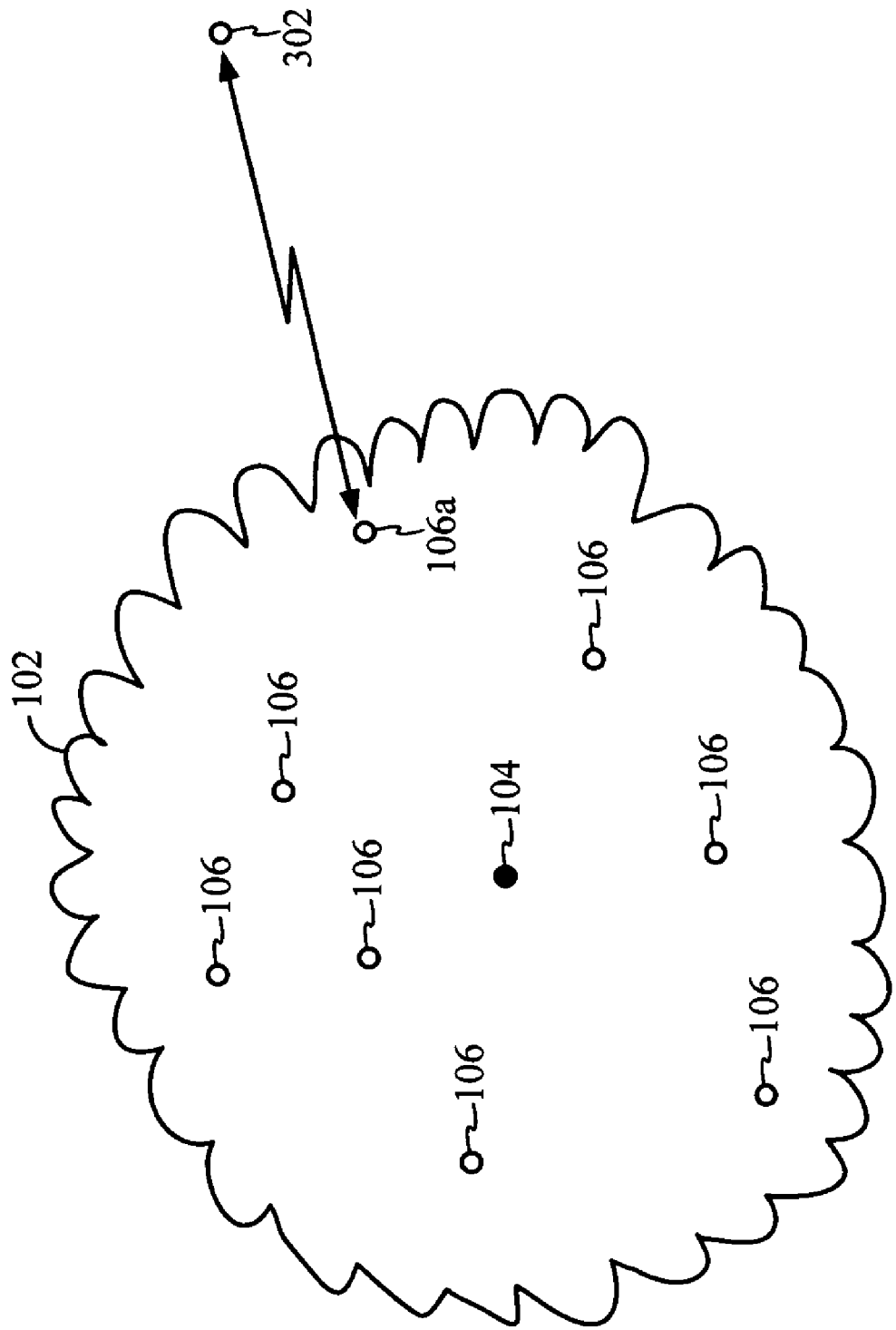
FIG. 3 is a conceptual diagram illustrating an example of a piconet having a peer-to-peer connection with an isolated terminal.

In some instances, a terminal may be unable to find a pilot signal of sufficient signal strength to support the minimum or threshold data rate. This may result from any number of reasons. By way of example, the terminal may be too far from the master terminal. Alternatively, the propagation environment may be insufficient to support the requisite data rate. In either case, the terminal may be unable to join an existing piconet, and therefore, may begin operating as an isolated terminal by transmitting its own pilot signal. FIG. 3 illustrates an example of a network topology with a wireless terminal 302 that is unable to join the piconet 102 of FIG. 1.

The master terminal 104 may designate a number of member terminals 106 as "piconet edge terminals", such as the member terminal 106a. The designation of piconet edge terminals may be based on feedback from the various member terminals 106. The feedback may be used to provide a rough indication of those member terminals located at the edge of the piconet 102. The piconet edge terminal 106a may be assigned the task of searching for pilot signals from isolated terminals. When a piconet edge terminal 106a detects a pilot signal from an isolated terminal that cannot support the minimum required data rate, such as the isolated terminal 302 shown in FIG. 3, then the piconet edge terminal 106a may establish a peer-to-peer connection with the isolated terminal 302. The piconet edge terminal 106a becomes an "inter-piconet bridge terminal" to support communications between the isolated terminal 302 and a member terminal 106 in the piconet 102.

Figure 4:
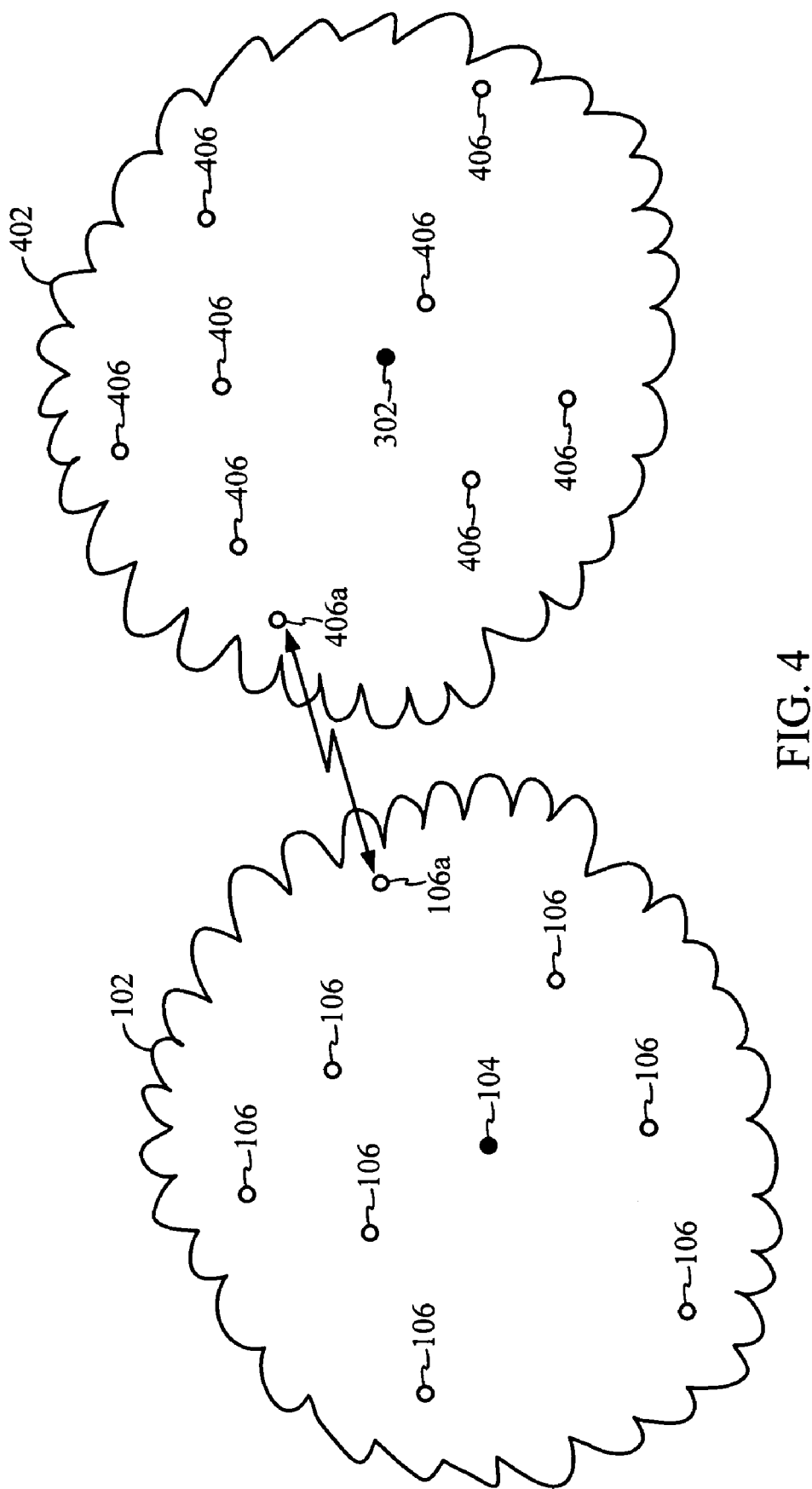
FIG. 4 is a conceptual diagram illustrating an example of two adjacent piconets.

The isolated terminal 302 may become the master terminal for a new piconet. Other terminals that are able to receive the pilot signal broadcast from the isolated terminal 302 with sufficient strength may attempt to acquire that pilot signal and join the piconet of this isolated terminal. FIG. 4 illustrates an example of a network topology of this kind. The first piconet 102 is the same piconet described in connection with FIG. 1 with its master terminal 104 supporting several member terminals 106. The isolated terminal 302 described in connection with FIG. 3 has become the master terminal for a second piconet 402. The master terminal 302 in the second piconet 402 may be used to support multiple member terminals 406.

Using feedback from the various member terminals 406, the master terminal 302 in the second piconet 402 may designate one or more member terminals 406 as piconet edge terminals, such as the member terminal 406a. As described in greater detail above, the master terminal 104 in the first piconet 102 may also designate one or more member terminals 106 as piconet edge terminals, such as the member terminal 106a. Each piconet edge terminal may search for pilot signals from isolated terminals and master terminals of adjacent piconets unable to support the minimum required data rate. By way of example, when the piconet edge terminal 106a from the first piconet 102 detects the pilot signal broadcast from the master terminal 302 in the second piconet 402, it may establish a connection with that master terminal 302. The master terminal 302 may maintain that connection, or alternatively, assign a piconet edge terminal 406a in the second piconet 402 to maintain the connection. The piconet edge terminals 106a and 406a may be referred to as "inter-piconet bridge terminals". Communications between a terminal in the first piconet 102 and a terminal in the second piconet 402 may be supported through the inter-piconet bridge terminals 106a and 406a.

The master terminal 104 may use a periodic frame structure to coordinate communications within the piconet, or "intra-piconet communications". This frame is typically referred to in the art as a Medium Access Control (MAC) frame because it is used to provide access to the communications medium for various terminals. The frame may be any duration depending on the particular application and overall design constraints. For the purpose of discussion, a frame duration of 5 ms will be used. A 5 ms frame is reasonable to accommodate a high chip rate of 650 Mcps and a desire to support data rates down to 19.2 kbps.

Figure 5:
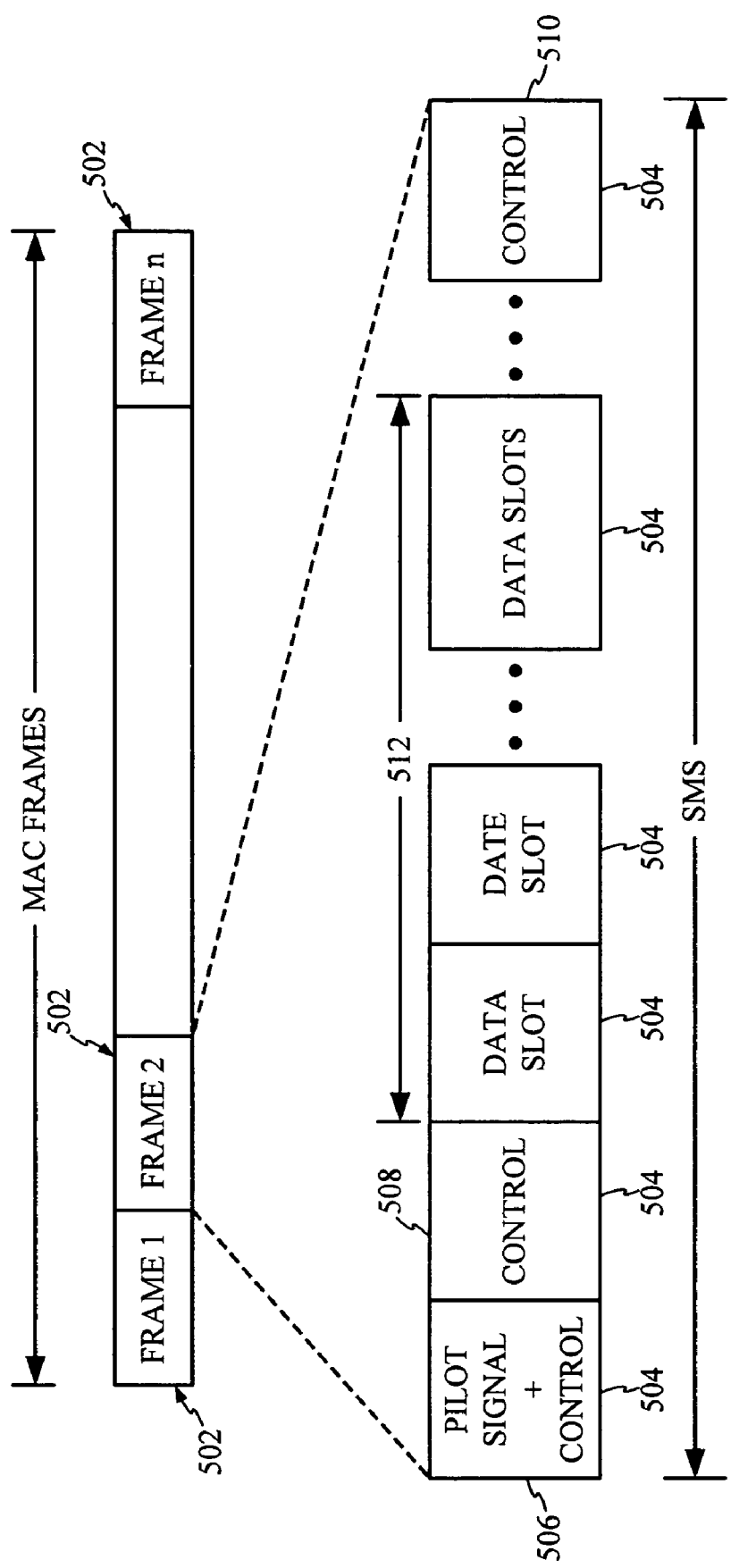
FIG. 5 is a conceptual diagram illustrating an example of a Medium Access Control (MAC) frame for controlling intra-piconet communications.

An example of a MAC frame structure is shown in FIG. 5 with n number of frames 502. Each frame may be divided into 160 or another number of time slots 504. The slot duration may be 31.25 µs, which corresponds 20,312.5 chips at 650 Mcps. The frame may dedicate some of its slots for overhead. By way of example, the first slot 506 in the frame 502 may be used to broadcast the spread-spectrum pilot signal to all the member terminals. The pilot signal may occupy the entire slot 506, or alternatively, be time shared with a control channel as shown in FIG. 5. The control channel occupying the end of the first slot 506 may be a spread-spectrum signal broadcast to all the member terminals at the same power level as the pilot signal. The master terminal may use this control channel to define the composition of the MAC frame.

The master terminal may be responsible for scheduling intra-piconet communications. This may be accomplished through the use of one or more additional spread-spectrum control channels which occupy various time slots within the frame, such as time slots 508 and 510 in FIG. 5. These additional control channels may be broadcast by the master terminal to all the member terminals and include various scheduling information. The scheduling information may include time slot assignments for communications between terminals within the piconet. As shown in FIG. 5, these time slots may be selected from the data slots portion 512 of the frame 502. Additional information, such as the power level and data rate for each communication between terminals, may also be included. The master terminal may also assign multiple terminal pairs to any given time slot using a CDMA scheme. In this case, the scheduling information may also assign the spreading codes to be used for the individual communications between terminals.

Figure 6:
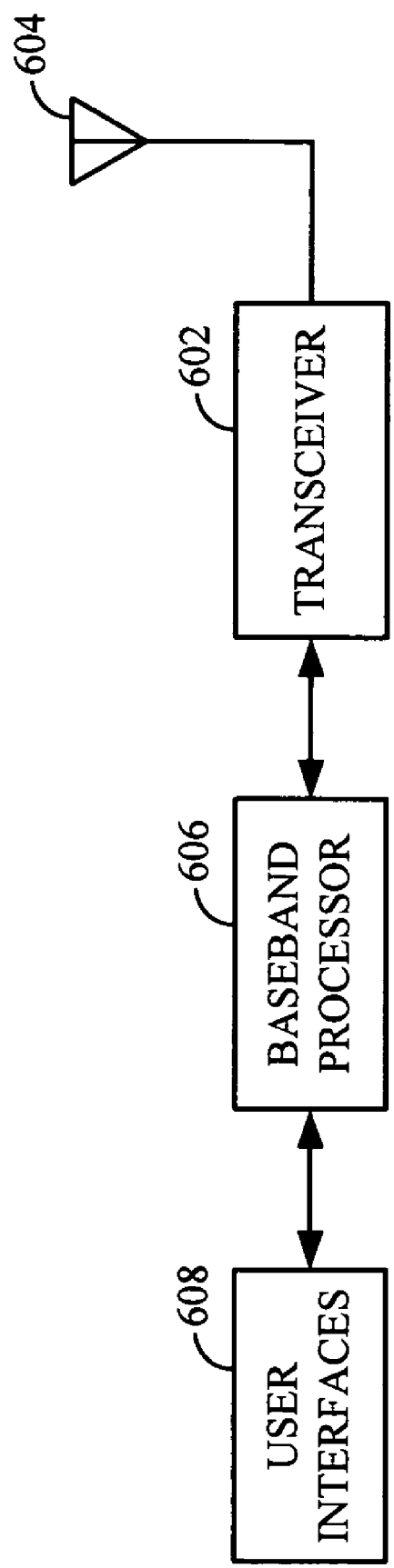
FIG. 6 is a functional block diagram illustrating an example of a terminal capable of operating within a piconet.

FIG. 6 is a conceptual block diagram illustrating one possible configuration of a terminal. As those skilled in the art will appreciate, the precise configuration of the terminal may vary depending on the specific application and the overall design constraints. For the purposes of clarity and completeness, the various inventive concepts will be described in the context of a UWB terminal with spread-spectrum capability, however, such inventive concepts are likewise suitable for use in various other communication devices. Accordingly any reference to a spread-spectrum UWB terminal is intended only to illustrate the various aspects of the invention, with the understanding that such aspects have a wide range of applications.

The terminal may be implemented with a front end transceiver 602 coupled to an antenna 604. A baseband processor 606 may be coupled to the transceiver 602. The baseband processor 606 may be implemented with a software based architecture, or another type of architecture. The software based architecture may configured with a microprocessor (not shown) that serves as a platform to run software programs that, among other things, provide executive control and overall system management functions that allow the terminal to operate either as a master or member terminal in a piconet. The baseband processor 606 may also include a digital signal processor (DSP) (not shown) with an embedded communications software layer which runs application specific algorithms to reduce the processing demands on the microprocessor. The DSP may be used to provide various signal processing functions such as pilot signal acquisition, time synchronization, frequency tracking, spread-spectrum processing, modulation and demodulation functions, and forward error correction.

The terminal may also include various user interfaces 608 coupled to the baseband processor 606. The user interfaces may include, by way of example, a keypad, mouse, touch screen, display, ringer, vibrator, audio speaker, microphone, camera and/or the like.

Figure 7:
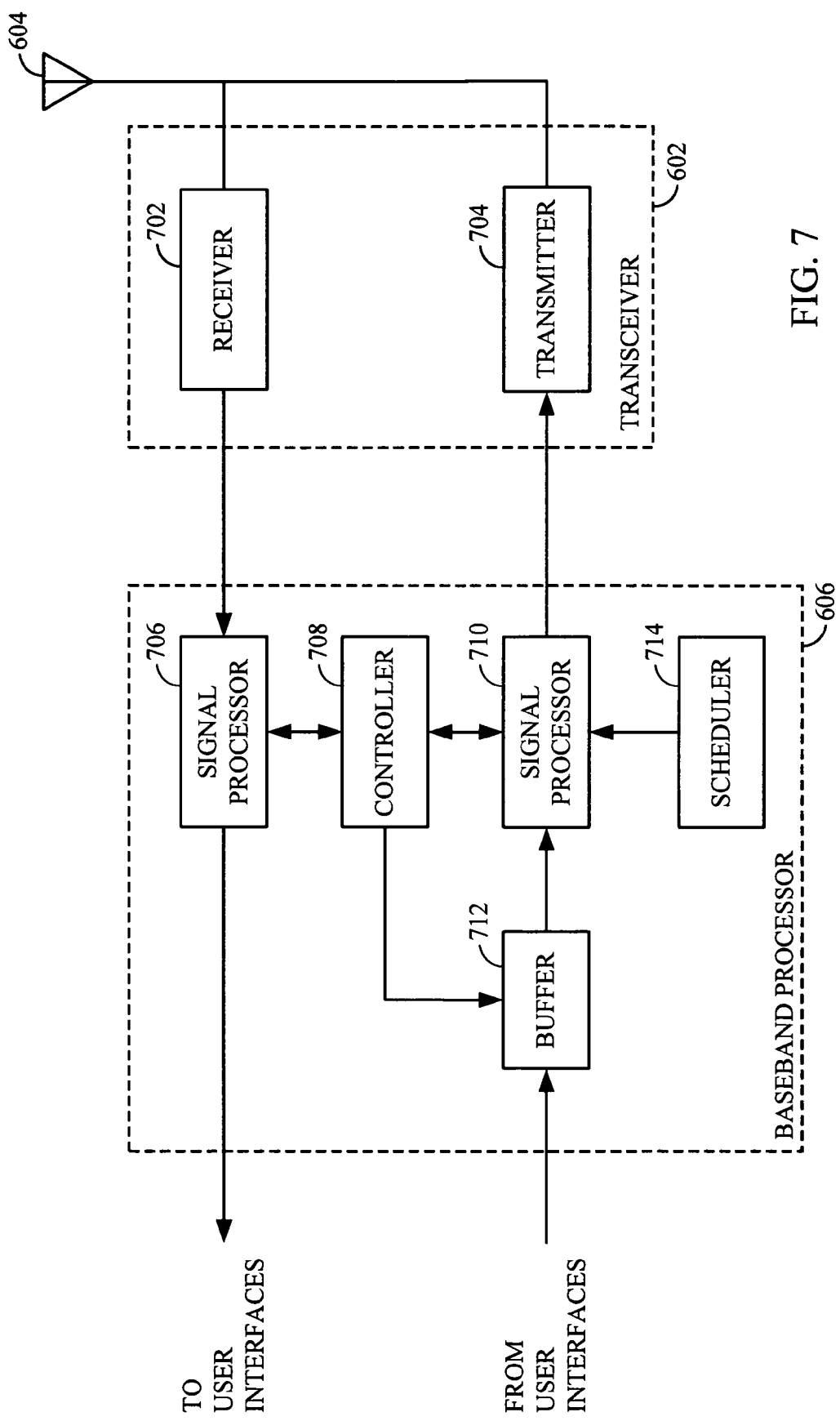
FIG. 7 is a functional block diagram illustrating an example of a baseband processor for a terminal.

FIG. 7 is a conceptual block diagram illustrating an example of a baseband processor. The baseband processor 606 is shown with the transceiver 602. The transceiver 602 may include a receiver 702. The receiver 702 provides detection of desired signals in the presence of noise and interference. The receiver 702 may be used to extract the desired signals and amplify them to a level where information contained in the received signal can be processed by the baseband processor 606.

The transceiver 602 may also include a transmitter 704. The transmitter 704 may be used to modulate information from the baseband processor 606 onto a carrier frequency. The modulated carrier may be upconverted to an RF frequency and amplified to a sufficient power level for radiation into free space through the antenna 604.

The baseband processor 606 may be responsible for configuring the terminal as a master or member terminal of the piconet depending on the results of the pilot signal acquisition process. When the baseband processor 606 configures the terminal as a member terminal of the piconet, a signal processor 706 on the receiving end may be used to extract scheduling information broadcast by the piconet master terminal over one or more control channels. The signal processor 706 may use spread-spectrum processing, in conjunction with digital demodulation and forward error correction techniques, to extract the pertinent scheduling information from the control channel and provide it to a controller 708 for processing. The controller 708 may use the scheduling information to determine the time slots for the various transmissions to and from the member terminal, as well as the power level and data rate for each.

In the receive mode, the controller 708 may be used to provide data rate and spreading information to the signal processor 706 on the receiving end for the scheduled transmissions to the member terminal. Using this information, the signal processor 706 may recover information embedded in the transmissions from other terminals at the appropriate times and provide the recovered information to the various user interfaces.

A signal processor 710 on the transmitting end may be used to spread information destined for various other terminals. The information may be originated from the various user interfaces 608 and stored in a buffer 712 until the scheduled transmission. At the scheduled time, the controller 708 may be used to release the information from the buffer 712 to the signal processor 710 for spread-spectrum, processing. The signal processor 710 may also employ digital modulation and forward error correction techniques. The data rate, spreading code and power level of the transmission may be programmed into the signal processor 710 by the controller 708. Alternatively, the transmission power level may be programmed by the controller 708 at the transmitter 704 in the transceiver 602.

When the baseband processor 606 configures the terminal as the master terminal of the piconet, it may enable a scheduler 714. In the software based implementation of the baseband processor 606, the scheduler 706 may be a software program running on the microprocessor. However, as those skilled in the art will readily appreciate, the scheduler 714 is not limited to this embodiment, and may be implemented by other means known in the art, including a hardware configuration, firmware configuration, software configuration, or combination thereof, which is capable of performing the various functions described herein.

The scheduler 714 may be used to generate scheduling information to support intra-piconet communications. The scheduling information may be derived based on any number of considerations and/or in accordance with any known scheduling algorithm. By way of example, scheduling information may be made based on a priority system, where voice communications are given priority over high latency communications. The scheduler 714 may also give priority to high data rate transmissions in an effort to maximize throughput. Further increases in throughput may be achieved by scheduling parallel transmissions using spread-spectrum techniques. By carefully selecting the terminal pairs that will engage in parallel communications, intra-piconet interference may be managed. A fairness criteria that considers the amount of data to be transferred between terminal pairs and the delay already experienced by such terminal pairs may also be considered. Other factors may be considered and are within the scope of the present invention. Those skilled in the art will be readily able to adapt existing scheduling algorithms to any particular piconet application.

Inter-piconet interference may be managed through the use of time hopping techniques. "Time hopping" refers to a process whereby a communication between two terminal pairs in a piconet are assigned a block of time slots in the MAC frame to handle the call, and then "reordered" or "randomized" before each transmission. The "reordering" or "randomizing" of the time slots in the MAC frame may be referred to herein as a "permutation." Each MAC frame may have a different permutation which follows a pseudo-random permutation sequence.

In at least one embodiment of the piconet, a block assignment for a call between two member terminals may be made by the scheduler 714 in the master terminal and transmitted to the two member terminals during call set-up. The controller 708 in each of the two member terminals may then reorder or randomize the time slot assignments every frame using the pseudo-random permutation sequence. More specifically, the controller 708 may use a permutation function (g) to compute a permutation for each MAC frame. The permutation function (g) may be a function of two input parameters, namely, an initial seed unique to the piconet and the frame count. The initial seed may be, by way of example, the identifier (ID) of the master terminal to which the member terminal is slaved. The master terminal ID is typically referred to as a MAC ID. The initial seed and the frame count may be maintained at the master terminal and provided to the various member terminals during call set-up. A permutation (p) of size n, where n is the number of time slots in a MAC frame, may be represented by the following relationship:

p=g(initial seed, frame count); and p(i)=j, i,j=1 . . . n

The permutation function (g) is known by all terminals in the network. When a terminal joins a piconet, it obtains the initial seed and the current frame count from the master terminal of that piconet during the registration process. With this approach, the data related to the permutation function needs to be sent from the master terminal only once during the registration process rather than every frame.

In the event that a connection is set up between two terminals in a different piconets, then the permutation function (g) between the two terminals should be the synchronized. This may be accomplished in a variety of ways. Referring to FIG. 2, by way of example, if a terminal 106 in the first piconet 102 initiates a call with a terminal 208 in the second pioconet 204, then the initial seed and the current frame count of the first piconet 102 may be provided from the terminal 106 to the terminal 208 during call-set-up. This information allows the terminal 208 in the second piconet 204 to generate the same permutation that the terminal 106 in the first piconet 102 uses in every MAC frame.

Figures 8A, 8B:
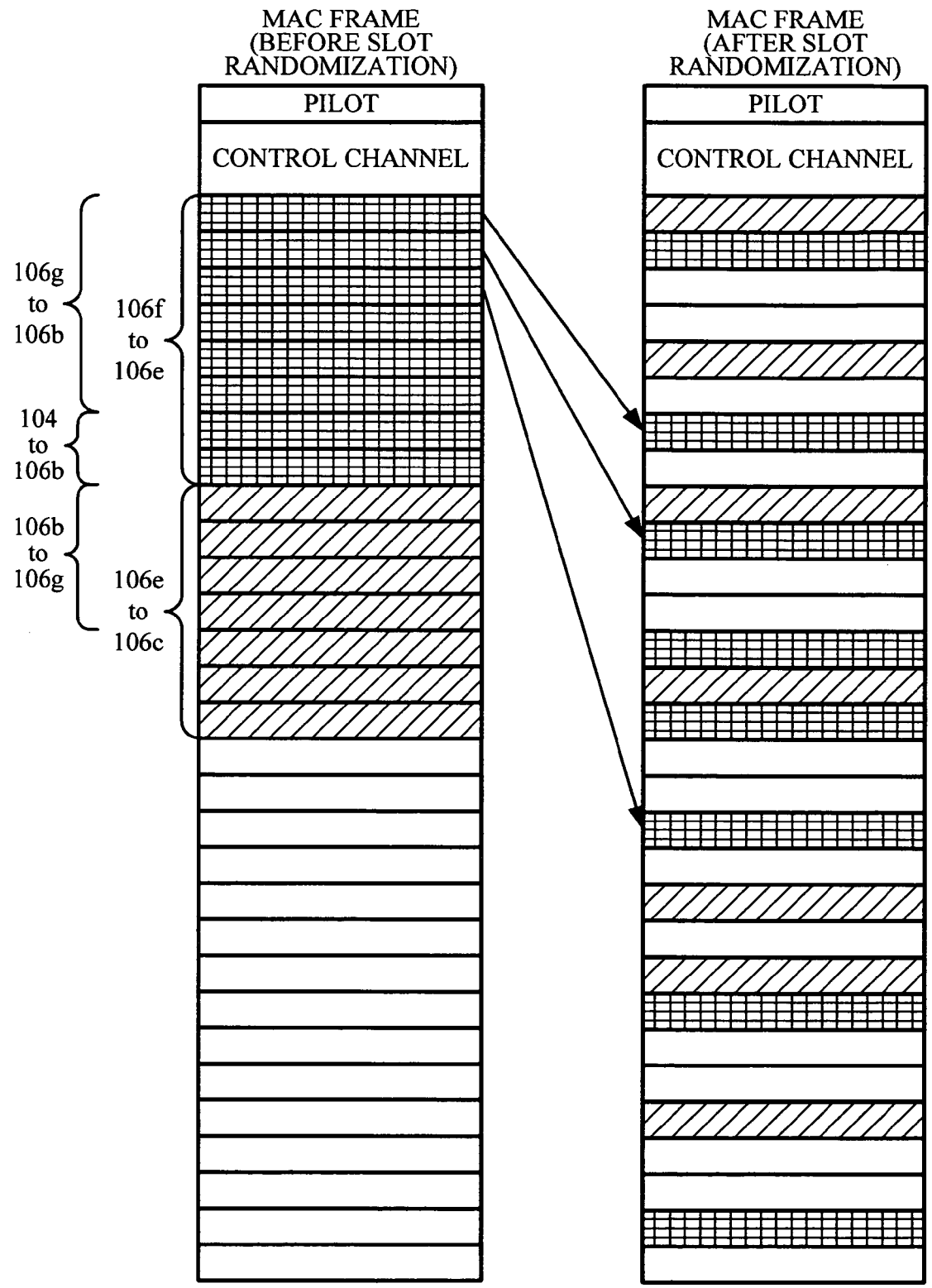
FIG. 8 is a conceptual diagram illustrating an example of a MAC before and after time slot randomization.

An example of a permutation for a single MAC frame will be described in connection with FIGS. 1, 7 and 8. A MAC frame before slot randomization is shown in FIG. 8A. The scheduler may use this MAC frame to assign blocks of time slots to intra-piconet communications in accordance with any of the scheduling considerations discussed earlier. In the example shown, a first transmission from the member terminal 106f to the member terminal 106e has been assigned to data slots 1-8. Simultaneously with the first transmission, is a transmission from the member terminal 106g to the member terminal 106b assigned to data slots 1-5, and a transmission from the master terminal 104 to the member terminal 106b assigned to data slots 6-8. These data slots are shown as shaded regions in FIGS. 8A and 8B. Later transmissions from the member terminal 106e to the member terminal 106c are assigned to data slots 9-15 and from the member terminal 106b to the member terminal 106g are assigned to data slots 9-12. These time slots are shown with slanted lining.

The signal processor 710 on the transmitting end may be used to spread the block assignments before being provided to the transceiver 602 for broadcast to the various member terminals during call set-up. For communications involving the master terminal, the pertinent block assignments may be routed from the scheduler 714 to the controller 708, either directly or through the signal processor 710.

The controller 708 in the appropriate terminals may be used to "reordered" or "randomized" the assigned time slots in accordance with the permutation function (g) before transmission. FIG. 8B is an example of the single MAC frame permutation. One can readily see from FIGS. 8A and 8B, that data slot 1 has been mapped to data slot 7, data slot 2 to data slot 10, data slot 3 to data slot 18, and so on. By mapping the data slots of the MAC frame for each piconet with a permutation that changes every frame in a different fashion for each piconet, an interference averaging effect is seen by each piconet.

Figures 9A, 9B:
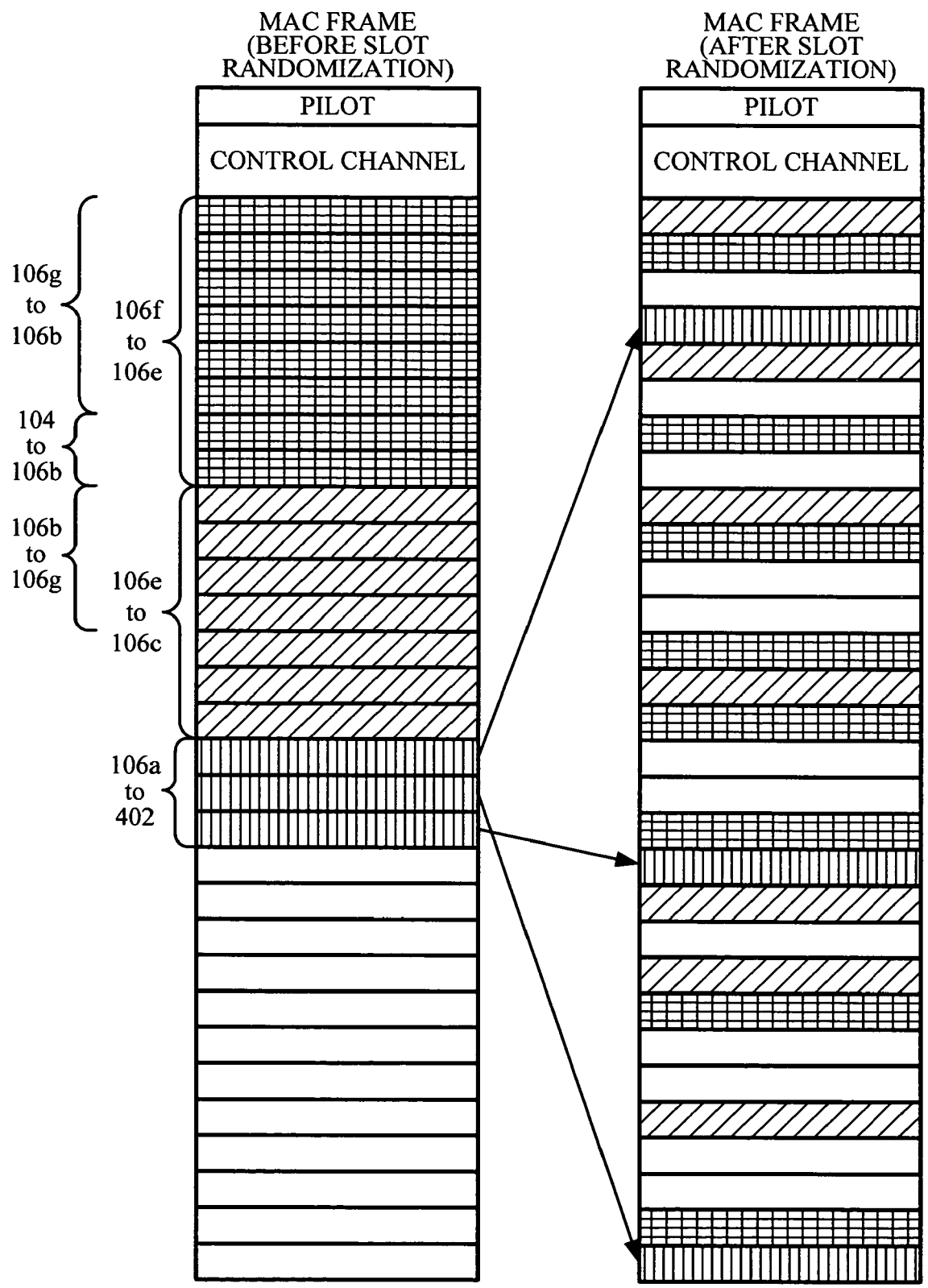
FIG. 9 is a conceptual diagram illustrating another example of a MAC before and after time slot randomization.

The scheduler may periodically set aside a fraction of the time for peer-to-peer communications. During this time, the inter-piconet bridge terminals may transmit to an isolated terminal or a distant piconet. Transmissions to a distant piconet may be either to its master terminal or its inter-piconet bridge terminal. These transmissions may require high transmit power, and in some instances can only be sustained at low data rates. In the event that high power transmissions are needed to communicate, the scheduler may decide not to assign any intra-piconet communications to the time slots supporting peer-to-peer communications. FIG. 9A shows a MAC frame permutation with a transmission from the inter-piconet bridge terminal 106a to the isolated terminal 302 of FIG. 3 assigned to data slots 16-18, shown with vertical lining. The data slots may be randomized by the controller in accordance with the permutation function as shown in FIG. 9B. Note that the scheduler in the master terminal has not assigned any other intra-piconet communications to the time slots assigned to the inter-piconet bridge terminal 106a to transmit to the isolated terminal 302.

Returning to FIG. 2, the member terminal 106a is shown as an intra-cluster bridge terminal between the two piconets 102 and 204 forming the piconet cluster 202. In some embodiments, the intra-cluster bridge terminal 106a may be configured to receive the pilot signal and the control channels from both the master terminals 104 and 406 simultaneously. In other embodiments, the intra-cluster bridge terminal 106a may only be able to receive transmissions from one master terminal at a time. The later approach reduces receiver complexity at the intra-cluster bridge terminal 106a, and therefore, may be desirable in some applications. If the intra-cluster bridge terminal 106a can only receive transmissions from one master terminal at a time, then it may signal to one of the master terminals to adjust its MAC frame start time. Thus, multiple piconets in a cluster may have synchronized MAC frames which are offset in time.

Different permutation functions among piconets of a cluster may present certain challenges to implementing of an efficient communications environment. By way of example, an "inter-piconet communication" from the intra-cluster bridge terminal 106a to a member terminal 208 in the second piconet 204 may be assigned by the master terminal 104 in the first piconet 102 to a block of time slots. However, since the two piconets use different permutation functions, communications within the second piconet 404 may interfere with the reception of the signal at the member terminal 408.

Several approaches may be used to reduce or minimize this type of interference. By way of example, the intra-cluster bridge terminal 106a may use a high spreading factor and a low data rate so that the signal can be decoded at the member terminal 208 even in the presence of other communications within the second piconet 204. Alternatively, the two piconets may coordinate their respective intra-piconet communications to avoid this type of interference.

An example of coordinating intra-piconet communications will be illustrated with the two piconet cluster shown in FIG. 2. Those skilled in the art will be readily able to extend the concepts disclosed herein to any number of piconets within a cluster. Referring to FIGS. 2 and 7, each master terminal 104 and 206 may provide to the other its initial seed and current frame count over one or more control channels in the MAC frame. This may be done through the intra-cluster bridge terminal 106a which communicates with both master terminals 104 and 206. More specifically, the scheduler 714 in each of the master terminals may provide its initial seed and current frame count to the baseband processor 606 for spread spectrum processing and transmit the sequence via the transceiver 602 to the intra-cluster bridge terminal 106a over one or more control channels. The intra-cluster bridge terminal 106a may forward the information received from each master terminal 104 and 206 to the other master terminal in much the same way.

The scheduler 714 in the master terminal 104 for the first piconet 102 may then assign a block of time slots to communicate with the intra-cluster bridge terminal 106a. During call set-up, a number of time slots may be assigned to support transmissions from the master terminal 104 to the intra-cluster bridge terminal 106a, and a number of time slots may be assigned to support transmissions in the reverse direction. These time slot assignments may be provided to the baseband processor 606 for spread spectrum processing before being transmitted, via the transceiver 602, to the intra-cluster bridge terminal 106a over one or more control channels. The intra-cluster bridge terminal 106a may randomize the time slot assignments using the permutation function with the initial seed and the current frame count maintained by the master terminal 104 for the first piconet 102 to obtain the scheduled time slots for the communication. These scheduled time slots may then be forwarded from the intra-cluster bridge terminal 106a to the master terminal 206 in the second piconet 204 in the same manner, and become constraints in the time slot assignments generated by the master terminal 206. Similarly, the scheduled time slots resulting from the block assignment by the master terminal 206 in the second piconet 202 to support communications with the intra-cluster bridge terminal 106a becomes a constraint in the time slot assignments generated by the master terminal 104 in the first piconet 102.

Figures 10A, 10B:
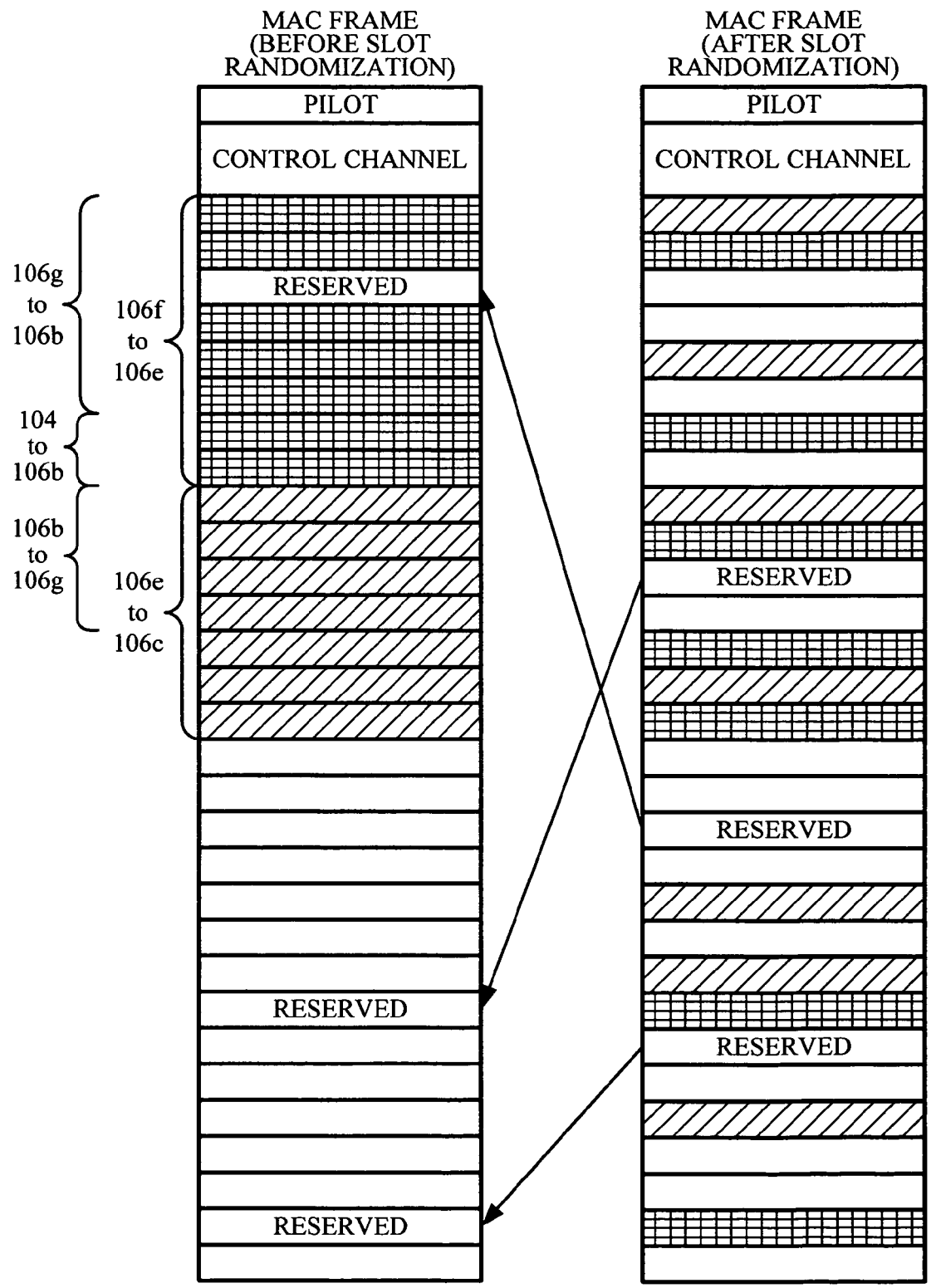
FIG. 10 is a conceptual diagram illustrating yet another example of a MAC before and after time slot randomization.

The constraints in the time slot assignments will be further illustrated with reference to FIGS. 2 and 10. A MAC frame for the first piconet 102 before slot randomization is shown in FIG. 10A, and the same MAC frame after slot randomization is shown in FIG. 10B. The time slots that have been scheduled for the master terminal 206 in the second piconet 404 to communicate with the intra-cluster bridge 106a are marked RESERVED in FIG. 10B. These are the scheduled time slots that result from applying the permutation function for the second piconet 204 to the block of time slots originally assigned by the master terminal 206. These RESERVED time slots in FIG. 10B may then be demapped using the permutation function for the first piconet 102 to the RESERVED time slots shown in FIG. 10A. These time slots are not available for scheduling intra-piconet communications in the first piconet 102.

The concept of coordinating inter-piconet communications between the two master terminals 104 and 206 may be extended to other terminals in the piconet cluster. Whenever a connection is to be set up between two terminals in different piconets, the master terminals of those piconets can mark out the assigned time slots as unavailable during call set-up. In this way, inter-piconet communications can be made with reduced interference.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor. The processor and the storage medium may reside in an ASIC. The ASIC may reside in the terminal, or elsewhere. In the alternative, the processor and the storage medium may reside as discrete components in the terminal, or elsewhere.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of scheduling communications over a frame having a plurality of time slots, comprising:
   assigning information to be transmitted between two terminals in a first piconet to a block of the time slots within a frame;
   reordering the time slot assignments within the frame using a permutation function, the permutation function being a function of frame count and an initial seed unique to the first piconet;
   receiving a different initial seed and frame count from a terminal in a second piconet; and
   receiving time slot assignments from the terminal in the second piconet for information to be transmitted between the terminal in the second piconet and a bridge terminal, the bridge terminal belonging to both the first and second piconets.

2. The method of claim 1 wherein the two terminals are in a first piconet, and wherein the method further comprises determining one or more time slots for a transmission between a terminal in a second piconet and a bridge terminal, the bridge terminal belonging to the first and second piconets, and using the determined one or more time slots as a constraint in the time slot assignments for the two terminals in the first piconet.

3. The method of claim 1 further comprising providing the initial seed, the frame count, and the time slot assignments to each of the two terminals, and wherein the reordering of the assigned time slots is performed at each of the two terminals.

4. The method of claim 1 wherein the method further comprising providing the initial seed and the frame count for the first piconet to the terminal in the second piconet.

5. The method of claim 1 further comprising reordering the received time slot assignments for the transmission between the terminal in the second piconet and the bridge terminal using the permutation function for the second piconet, demapping the reordered time slots for the transmission between the terminal in the second piconet and the bridge terminal using the permutation function for the first piconet, and using the demapped reordered time slots as a constraint in the block of time slot assignments for the information to be transmitted between the two terminal pairs.

6. The method of claim 1 further comprising identifying additional information to be transmitted between two different terminals, and assigning the additional information to at least a portion of the block of time slot assignments for the information.

7. The method of claim 6 further comprising assigning a first spreading code to the information, and a second spreading code to the additional information.

8. A communications terminal configured to operate in a first piconet, comprising:
   a transceiver configured to receive a block of time slot assignments within a frame for a transmission between a bridge terminal and a terminal in a second piconet, the bridge terminal belonging to the first and second piconets; and
   a scheduler configured to reorder the time slot assignments within the frame using a permutation function for the second piconet, demap the reordered time slots within the frame using a permutation function for the first piconet, and use the demapped time slots as a constraint in assigning a block of time slots within the frame for a transmission between two terminals in the first piconet, the permutation for the first piconet being different from the permutation function for the second piconet.

9. The communications terminal of claim 8 wherein the transceiver is further configured to transmit the block of time slot assignments for the transmission between the two terminals to each of the two terminals.

10. The communications terminal of claim 8 wherein the permutation function for the first piconet is a function of an initial seed and frame count relating to the first piconet and the permutation function for the second piconet is related to an initial seed and frame count relating to the second piconet.

11. The communications terminal of claim 10 wherein the initial seed for the first piconet uniquely identifies the communication terminal.

12. The communications terminal of claim 10 wherein the transceiver is further configured to receive the initial seed and the frame count for the second piconet, and provide the received initial seed and the frame count for the second piconet to the scheduler.

13. The communications terminal of claim 8 wherein the scheduler is further configured to assign a spreading code to the transmission between the two terminals in the first piconet, and wherein the transceiver is further configured to transmit the spreading code to each of the two terminals in the first piconet.

14. A communications terminal, comprising:
   means for assigning information to be transmitted between two terminals in a first piconet to a block of the time slots within a frame;
   means for reordering the time slot assignments within the frame using a permutation function, the permutation function being a function of frame count and an initial seed unique to the first piconet;
   means for receiving a different initial seed and frame count from a terminal in a second piconet; and
   means for receiving time slot assignments from the terminal in the second piconet for information to be transmitted between the terminal in the second piconet and a bridge terminal, the bridge terminal belonging to both the first and second piconets.

15. The communications terminal of claim 14 wherein the two terminals are in a first piconet, and wherein the communications terminal further comprises:
   means for determining one or more time slots for a transmission between a terminal in a second piconet and a bridge terminal, the bridge terminal belonging to the first and second piconets, and
   means for using the determined one or more time slots as a constraint in the time slot assignments for the two terminals in the first piconet.

16. A computer-readable media having instructions stored thereon that when executed by a computer, perform the steps of:
   assigning information to be transmitted between two terminals in a first piconet to a block of the time slots within a frame;
   reordering the time slot assignments within the frame using a permutation function, the permutation function being a function of frame count and an initial seed unique to the first piconet;
   receiving a different initial seed and frame count from a terminal in a second piconet; and
   receiving time slot assignments from the terminal in the second piconet for information to be transmitted between the terminal in the second piconet and a bridge terminal, the bridge terminal belonging to both the first and second piconets.

17. The computer-readable media of claim 16 wherein the instructions when executed by the computer further comprise the steps of:
   determining one or more time slots for a transmission between a terminal in a second piconet and a bridge terminal, the bridge terminal belonging to the first and second piconets, and
   using the determined one or more time slots as a constraint in the time slot assignments for the two terminals in the first piconet.

* * * * *